United States Patent
Ariga et al.

(10) Patent No.: US 10,753,887 B2
(45) Date of Patent: Aug. 25, 2020

(54) X-RAY CT MEASURING APPARATUS AND INTERFERENCE PREVENTION METHOD THEREOF

(71) Applicant: MITUTOYO CORPORATION, Kanagawa (JP)

(72) Inventors: Kozo Ariga, Tokyo (JP); Gyokubu Cho, Kanagawa (JP); Hidemitsu Asano, Kanagawa (JP); Masato Kon, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 79 days.

(21) Appl. No.: 16/250,167

(22) Filed: Jan. 17, 2019

(65) Prior Publication Data
US 2019/0227004 A1    Jul. 25, 2019

(30) Foreign Application Priority Data

Jan. 19, 2018  (JP) .................................. 2018-007743

(51) Int. Cl.
*G01N 23/046*  (2018.01)

(52) U.S. Cl.
CPC ... *G01N 23/046* (2013.01); *G01N 2223/3306* (2013.01); *G01N 2223/419* (2013.01)

(58) Field of Classification Search
CPC ......... G01N 23/046; G01N 2223/3306; G01N 2223/419; G01N 2223/1016; G01B 15/04; G01B 15/00
USPC ........................................................ 378/15
See application file for complete search history.

(56) References Cited

U.S. PATENT DOCUMENTS

| | | |
|---|---|---|
| 8,804,905 B2 | 8/2014 | Christoph et al. |
| 9,625,257 B2 | 4/2017 | Christoph et al. |
| 2018/0120242 A1 | 5/2018 | Takahashi et al. |

FOREIGN PATENT DOCUMENTS

| | | |
|---|---|---|
| JP | 2002-055062 A | 2/2002 |
| JP | 2002-071345 A | 3/2002 |
| JP | 2004-012407 A | 1/2004 |
| JP | 2004-045212 A | 2/2004 |
| JP | 2004-301860 A | 10/2004 |
| JP | 2004-301861 A | 10/2004 |
| JP | 5408873 B2 | 2/2014 |

OTHER PUBLICATIONS

U.S. Appl. No. 16/299,513 to Kozo Ariga et al., filed Mar. 12, 2019.

(Continued)

*Primary Examiner* — David P Porta
*Assistant Examiner* — Gisselle M Gutierrez
(74) *Attorney, Agent, or Firm* — Greenblum & Bernstein, P.L.C.

(57) ABSTRACT

An X-ray CT measuring apparatus configured to emit an X-ray from an X-ray source while rotating a subject arranged on a rotary table, and obtain a tomographic image of the subject by reconstructing projection images, includes an imaging unit for imaging the subject on the rotary table from above or sideways, an obtaining unit for obtaining an image of the subject while rotating the subject, a calculating unit for calculating a maximum outer diameter of the subject during rotation by using the obtained image of the subject, and a setting unit for setting a movement limit of the rotary table on the basis of the maximum outer diameter.

8 Claims, 5 Drawing Sheets

(56) References Cited

OTHER PUBLICATIONS

U.S. Appl. No. 16/291,699 to Hidemitsu Asano et al., filed Mar. 4, 2019.
U.S. Appl. No. 16/291,674 to Sadayuki Matsumiya et al., filed Mar. 4, 2019.
U.S. Appl. No. 16/250,201 to Hidemitsu Asano et al., filed Jan. 17, 2019.

ROTATION TRACK OF SUBJECT
(DIAMETER OF WHICH IS MAXIMUM OUTER DIAMETER Dmax)

X-RAY CT MEASURING APPARATUS AND INTERFERENCE PREVENTION METHOD THEREOF

CROSS-REFERENCE TO RELATED APPLICATION

The disclosure of Japanese Patent Application No. 2018-007743 filed on Jan. 19, 2018 including specifications, drawings and claims is incorporated herein by reference in its entirety.

TECHNICAL FIELD

The present invention relates to an X-ray CT measuring apparatus and an interference prevention method thereof. In particular, the present invention relates to an X-ray CT measuring apparatus that can automatically make a movement limit setting for preventing interference of an X-ray tube with a subject, and an interference prevention method thereof.

BACKGROUND ART

An X-ray CT measuring apparatus configured to obtain a tomographic image of a subject (measurement object) in a nondestructive manner has been known (see Japanese Patent Application Laid-Open Nos. 2002-55062 and 2004-12407 and Japanese Patent No. 5408873). The X-ray CT measuring apparatus performs X-ray irradiation while rotating the subject which is arranged at the center of a rotary table.

FIG. 1 shows a configuration of a typical X-ray CT apparatus used for measurement. An X-ray tube 12, an X-ray detector 14, a rotary table 16, and an XYZ moving mechanism unit 18 are accommodated in an enclosure 10 which shields X-rays. The X-ray tube 12 emits X-rays 13. The X-ray detector 14 detects the X-rays 13. A subject 8 is placed on the rotary table 16, and the rotary table 16 rotates the subject 8 for CT imaging. The XYZ moving mechanism unit 18 is intended to adjust the position and magnification of the subject 8 captured by the X-ray detector 14. The X-ray CT apparatus further includes a controller 20 which controls the devices, and a control personal computer (PC) 22 which gives instructions to the controller 20 on the basis of user operations.

Aside from the function of controlling the devices, the control PC 22 has a function of displaying a projection image of the subject 8 captured by the X-ray detector 14 and a function of reconstructing a tomographic image from a plurality of projection images of the subject 8.

When the X-rays 13 pass through an object, there occurs a considerable amount of scattered X-rays reflected in directions different from the irradiation direction. Such scattered X-rays are known to appear as noise in an X-ray CT imaging result. To suppress the scattered X-rays, an X-ray collimator 24 is arranged near the X-ray tube 12. To limit the irradiation range of the X-rays in a vertical direction, the X-ray collimator 24 includes parts, or an upper movable part 24A and a lower movable part 24B, that are made of a radiopaque material (such as tungsten). The parts 24A and 24B are each configured to be vertically movable. The positions of the upper and lower movable parts 24A and 24B of the X-ray collimator 24 are controlled by the control PC 22 according to the imaging range of the subject 8.

As shown in FIG. 2 (perspective view) and FIG. 3 (plan view), the X-rays 13 emitted from an X-ray source including the X-ray tube 12 are transmitted through the subject 8 on the rotary table 16 and reach the X-ray detector 14. The X-ray detector 14 obtains transmission images (projection images) of the subject 8 in all directions while rotating the subject 8. The transmission images are reconstructed by a reconstruction algorithm such as a back projection method or an iterative reconstruction method to generate a tomographic image of the subject 8.

The position of the subject 8 can be moved by controlling X-, Y-, and Z-axes of the XYZ moving mechanism unit 18 and a θ-axis of the rotary table 16. The imaging range (position and magnification) and the imaging angle of the subject 8 can be thereby adjusted.

Suppose, as shown in FIG. 4, that a center X0 of the rotary table 16 is moved toward the X-ray tube 12 along the X-axis. As shown in broken lines, the peripheral portion of the rotary table 16 can be moved up to a position X1 beyond the X-ray tube 12. The reason is that the X-ray tube 12 needs to be brought close to the subject 8 for enlarged imaging if the subject 8 is small. The X-ray tube 12 is structurally permitted to enter the range of the rotary table 16. The X-ray tube 12 and the rotary table 16 do not interfere with each other, since the X-ray tube 12 and the rotary table 16 are at different vertical positions as shown in FIG. 2.

A subject 8 that even falls inside the range of the rotary table 16 can thus interfere (collide) with the X-ray tube 12 if brought too close to the X-ray tube 12. Each time a subject 8 is set, an operator therefore needs to set a movement limit of the rotary table 16 in the X-axis direction in advance so that the X-ray tube 12 that emits the X-rays 13 does not interfere with the rotating subject 8 (see Japanese Patent Application Laid-Open Nos. 2004-45212 (paragraphs 0305 to 0308), 2004-301860 (paragraphs 0286 to 0289), and 2004-301861 (paragraphs 0286 to 0289)).

Specifically, an interference prevention procedure is performed as follows:

(1) Rotate the subject 8 on the rotary table 16 at position X0, and move the subject 8 by visual estimation to a direction (θ1) in which the subject 8 can interfere with the X-ray tube 12 during rotation.

(2) Bring the rotary table 16 close to the X-ray tube 12 while taking care not to cause interference between the X-ray tube 12 and the subject 8.

(3) At a position (X1) where the X-ray tube 12 and the subject 8 are sufficiently close to each other, rotate the subject 8 again while paying attention so that the subject 8 does not interfere with the X-ray tube 12. If interference is likely to occur, move the rotary table 16 somewhat away from the X-ray tube 12.

(4) If it is confirmed that the subject 8 does not cause interference during rotation, set the position (X1) as the movement limit value (lower limit) of the rotary table 16 in the X-axis direction.

SUMMARY OF THE INVENTION

Technical Problem

However, such an interference prevention operation has been quite troublesome since the operation needs to be performed each time the subject 8 is replaced or each time the subject 8 is moved on the rotary table 16.

Japanese Patent Application Laid-Open No. 2002-71345 describes a three-dimensional coordinate measuring apparatus including an X-ray CT apparatus and a probe type measuring apparatus. The three-dimensional coordinate measuring apparatus is described to generate contour shape data by using an X-ray CT tomographic image, and set an immeasurable range by checking the presence or absence of contact between the probe and the subject. However, such a technique used in three-dimensional coordinate measuring apparatus has not been usable for interference prevention of the X-ray CT apparatus alone.

The present invention has been made in order to solve the above-described problems in the conventional technique, and an object thereof is to achieve simple accurate interference prevention by enabling an automatic interference check between the X-ray tube and the subject and automatic movement limit setting of the rotary table upon which the result of the interference check is reflected.

Solution to Problem

The present invention has solved the foregoing problems by the provision of an X-ray CT measuring apparatus configured to emit an X-ray from an X-ray source arranged on one side of a rotary table while rotating a subject arranged on the rotary table, and obtain a tomographic image of the subject by reconstructing projection images obtained by an X-ray detector arranged on an opposite side of the rotary table, the X-ray CT measuring apparatus including: an imaging unit configured to image the subject on the rotary table from above or sideways; an obtaining unit configured to obtain an image of the subject while rotating the subject; a calculating unit configured to calculate a maximum outer diameter of the subject during rotation by using the obtained image of the subject; and a setting unit configured to set a movement limit, of the rotary table on the basis of the maximum, outer diameter.

The imaging unit may be a camera or a line sensor.

The imaging unit may be directed in a direction orthogonal to a line connecting the X-ray source and a center of the rotary table, and arranged so that a center of the imaging unit coincides with an end of the rotary table on an X-ray source side.

The present invention has also solved the foregoing problems by, on an occasion of interference prevention of an X-ray CT measuring apparatus configured to emit an X-ray from an X-ray source arranged on one side of a rotary table while rotating a subject arranged on the rotary table, and obtain a tomographic image of the subject by reconstructing projection images obtained by an X-ray detector arranged on an opposite side of the rotary table: imaging the subject from above or sideways and obtaining an image of the subject while rotating the subject on the rotary table; calculating a maximum outer diameter of the subject during rotation by using the obtained image of the subject; and setting a movement limit of the rotary table on the basis of the maximum outer diameter.

The rotation and imaging of the subject on the rotary table may be performed at a home position or reference position of the rotary table.

The rotation and imaging of the subject on the rotary table may be performed at constant angle pitches.

The maximum outer diameter may be calculated from calculation results of all pixels obtained by comparing a previously-prepared image including no subject with the image of the subject during rotation to calculate a position of presence of the subject with respect to each image pixel.

A movement limit value $X_{min}$ of the rotary table may be determined by the following equation:

$$X_{min} = D_{max}/2 + \alpha$$

where $D_{max}$ is the maximum outer diameter of the subject during rotation, and $\alpha$ is an amount of margin.

Advantageous Effects of Invention

According to the present invention, the movement limit setting for preventing interference between the X-ray tube and a subject can be automatically performed by one operation after the subject is arranged on the rotary table. This eliminates the need for manual, visual estimation-based movement limit setting by the operator. The movement limit setting which has been performed each time the subject is replaced or the subject is moved on the rotary table is thus automated with a significant improvement in work efficiency. In addition, the automated movement limit setting has high safety because the image of the subject can be captured at a remote position from the subject and the subject does not need to be brought close to the X-ray tube.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

With reference to the drawings, an embodiment of the present invention will be described below in more detail. Note that the present invention is not to be limited by the contents described in the following embodiments and examples. Additionally, the components in the embodiments and examples described below include those one skilled in the art can readily conceive or being substantially the same, i.e., the so-called equivalents. Furthermore, the components disclosed in the embodiments and examples described below may be combined as appropriate or may also be selected as appropriate for use.

Figure 1:
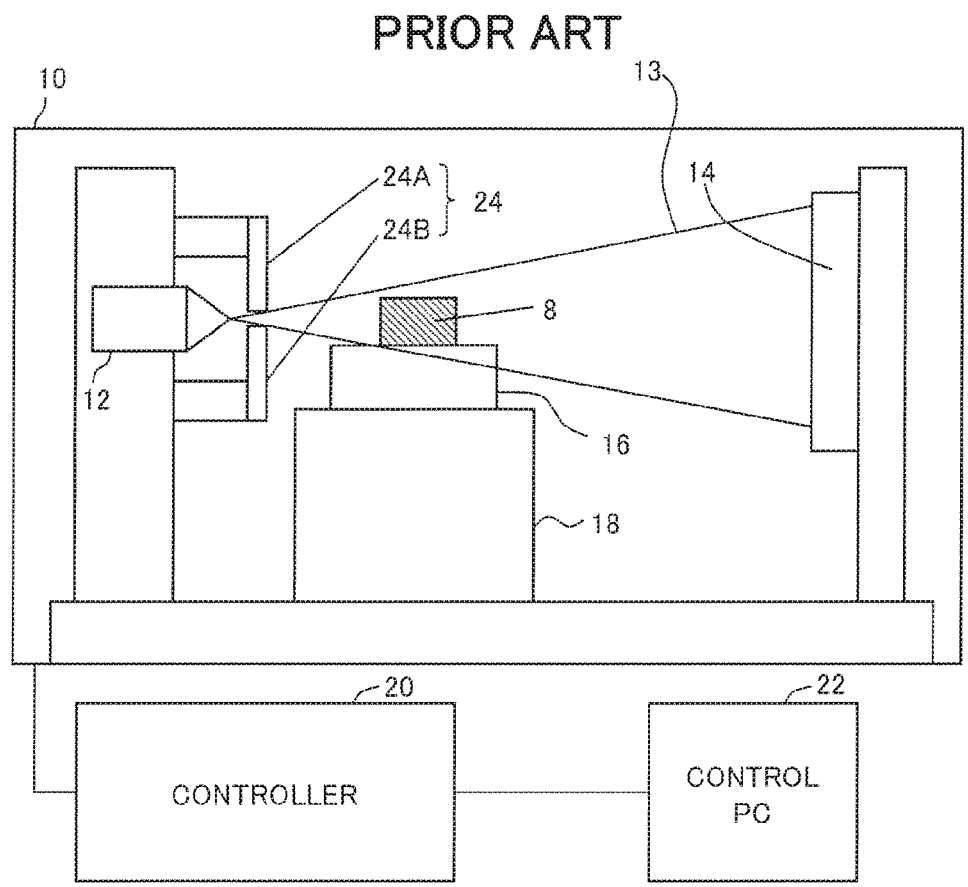
FIG. 1 is a cross-sectional view showing an overall configuration of a typical X-ray CT apparatus used for measurement.
Figure 2:
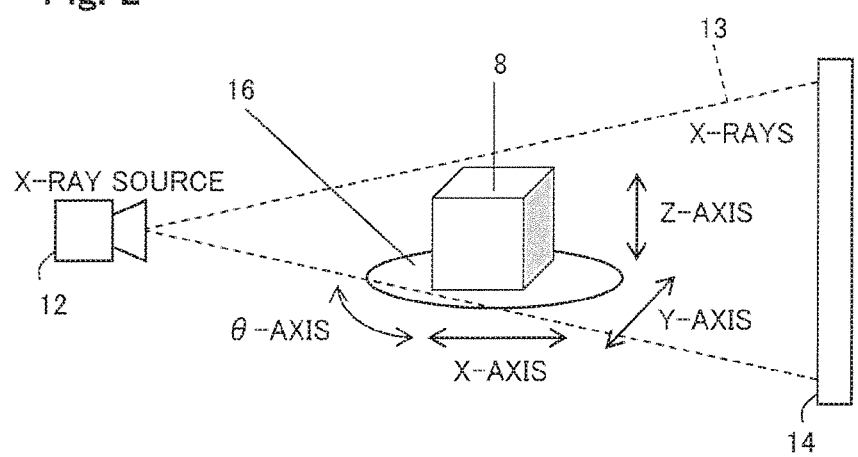
FIG. 2 is a perspective view showing a configuration of essential parts thereof.
Figure 3:
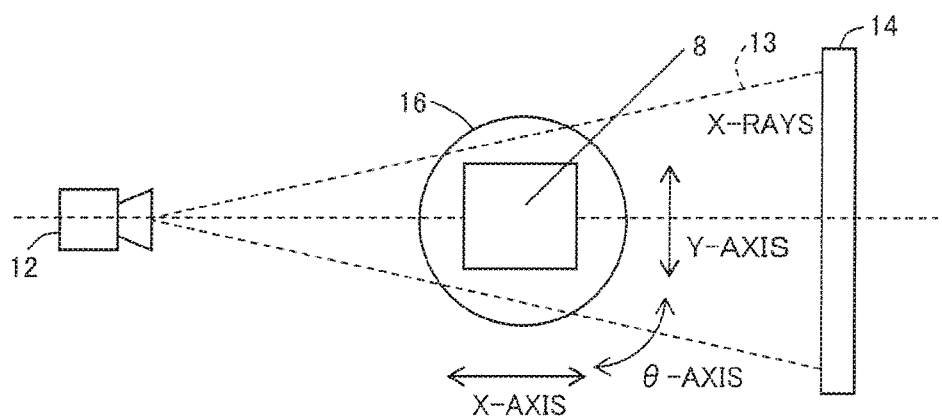
FIG. 3 is a plan view thereof.
Figure 4:
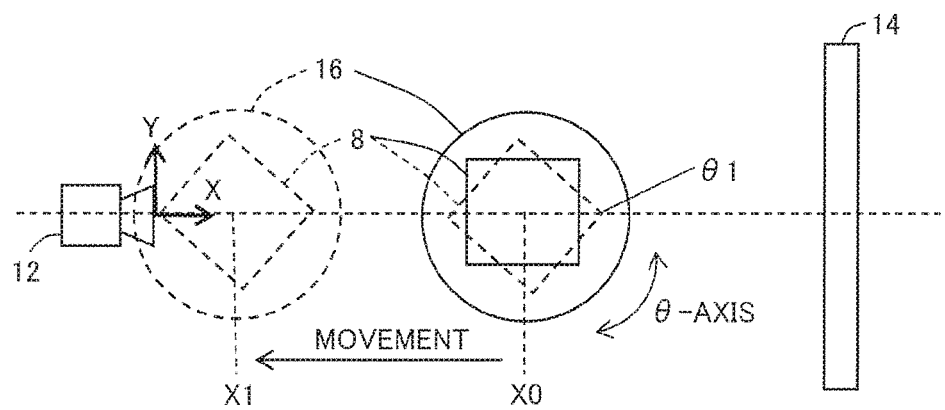
FIG. 4 is a plan view for describing a conventional interference prevention procedure.
Figure 5:
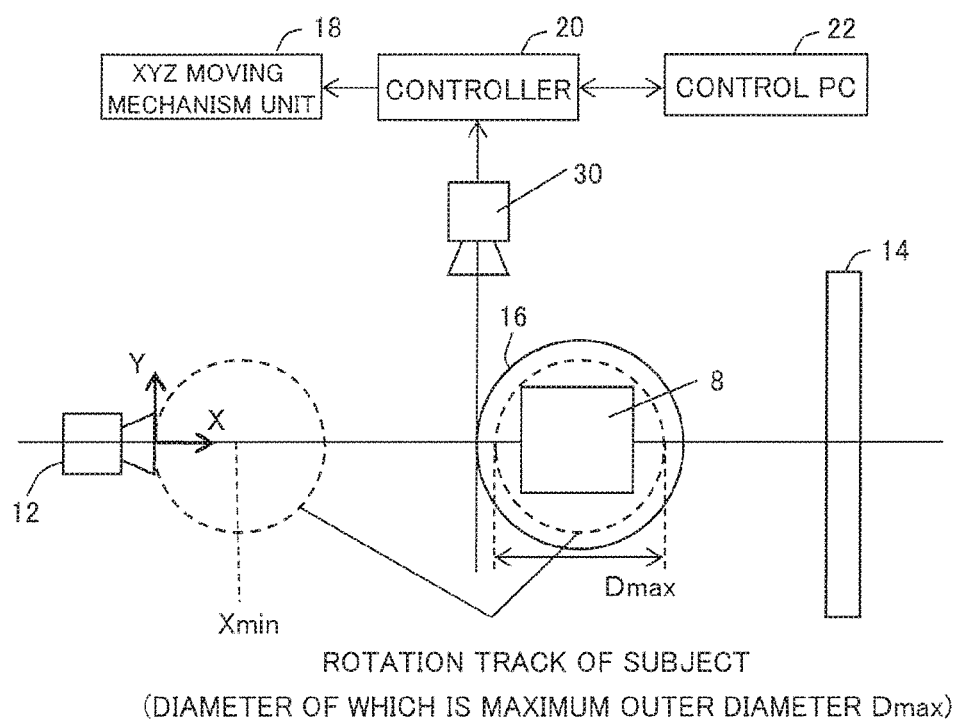
FIG. 5 is a plan view showing a configuration of essential parts of a first embodiment of an X-ray CT measuring apparatus according to the present invention.

FIG. 5 shows a configuration of essential parts according to a first embodiment of the present invention. In addition to conventional mechanisms, an imaging camera 30 is installed beside the rotary table 16 so that the side shape of the subject 8 can be imaged when the rotary table 16 is at a reference position (hereinafter, referred to as a home position). The imaging camera 30 is directed in a direction orthogonal to a line connecting the X-ray tube 12 and the center of the rotary table 16. The imaging camera 30 is installed at a position such that the front end (left end in FIG. 5) of the rotary table 16 coincides with the center of the imaging camera 30, The installation position is not limited thereto, and the imaging camera 30 may be installed beside the subject 8.

Figure 6:
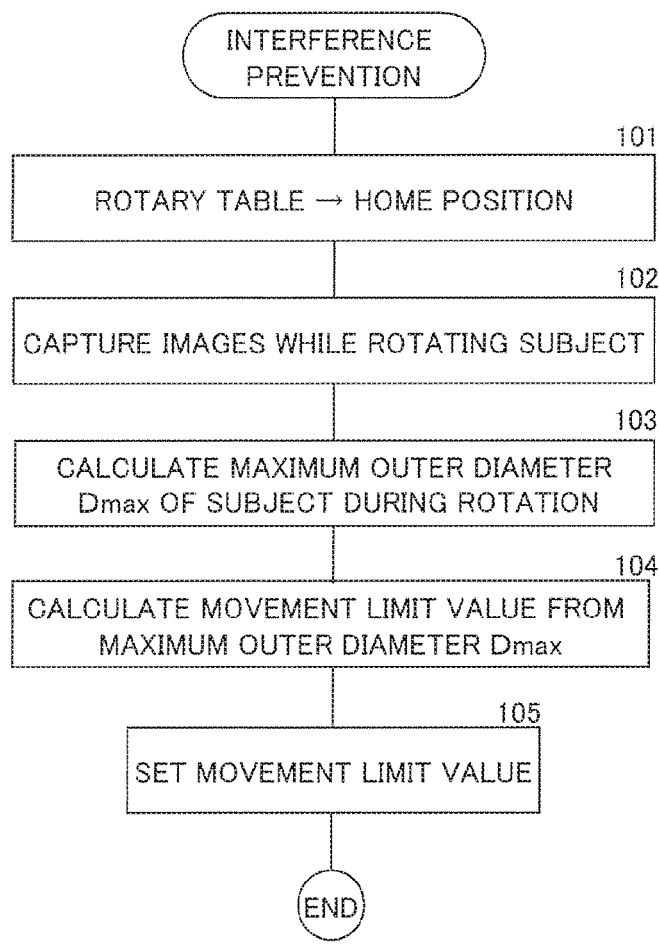
FIG. 6 is a flowchart showing an interference prevention procedure according to the first embodiment.

The movement limit setting of the rotary table 16 is performed, for example, by a procedure shown in FIG. 6 based on software built in the control PC 22.

Initially, in step 101, the rotary table 16 is moved to the home position.

Next, in step 102, imaging is performed at constant angle pitches while rotating the subject 8 with the rotary table 16 at the home position. A plurality of subject images are thereby obtained.

Next, in step 103, the maximum outer diameter $D_{max}$ of the subject 8 during rotation is calculated by using the obtained subject images. For calculation, a previously-prepared image not including the subject 8 and the images of the subject 8 during rotation are compared to calculate the position of presence of the subject 8 with respect to each image pixel. The maximum outer diameter $D_{max}$ of the subject 8 during rotation is calculated from the calculation results of all the pixels.

Next, in step 104, the movement limit value $X_{min}$ of the rotary table 16 in the X-axis direction is determined from the maximum outer diameter $D_{max}$ of the subject 8 during rotation by the following equation:

$$X_{min}=D_{max}/2+\alpha$$

Where α is the amount of margin.

Next, in step 105, the calculated movement limit value $X_{min}$ of the rotary table 16 in the X-axis direction is set into the control PC 22.

Figure 7:
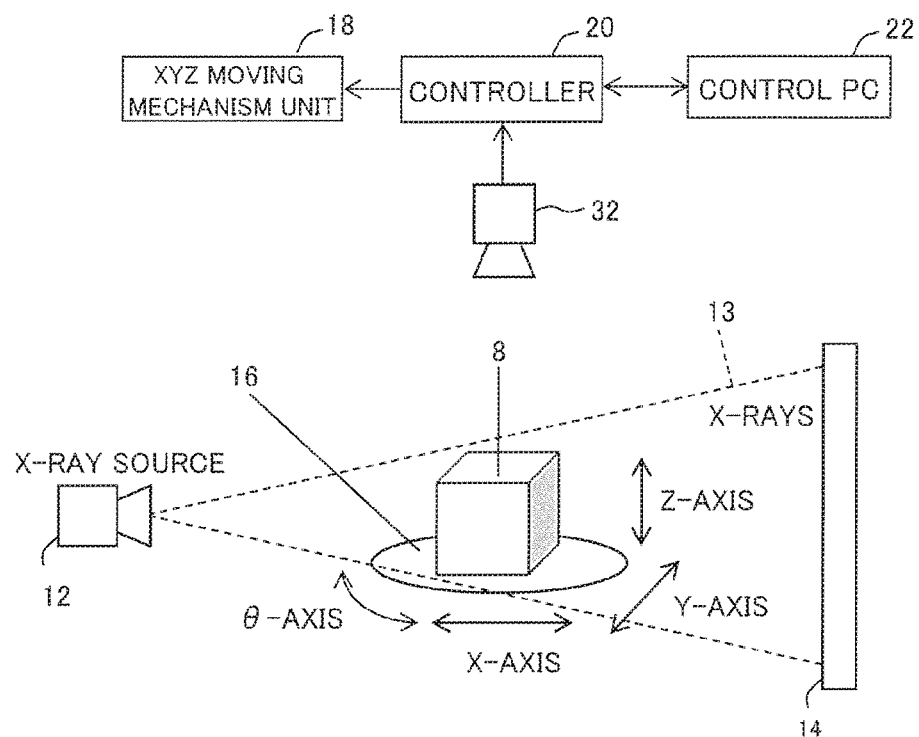
FIG. 7 is a plan view showing a configuration of essential parts of a second embodiment of the X-ray CT measuring apparatus according to the present invention.

In the first embodiment, the imaging camera 30 is used as the imaging unit, and arranged right beside the front end of the rotary table 16. However, the imaging unit and the arrangement position are not limited thereto. As in a second embodiment shown in FIG. 7, a line sensor 32 may be arranged above the subject 8.

The imaging unit are not limited to the imaging camera 30 or the line sensor 32.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. An X-ray CT measuring apparatus configured to emit an X-ray from an X-ray source arranged on one side of a rotary table while rotating a subject arranged on the rotary table, and obtain a tomographic image of the subject by reconstructing projection images obtained by an X-ray detector arranged on an opposite side of the rotary table, the X-ray CT measuring apparatus comprising:
    an imaging unit configured to image the subject on the rotary table from above or sideways;
    an obtaining unit configured to obtain an image of the subject while rotating the subject;
    a calculating unit configured to calculate a maximum outer diameter of the subject during rotation by using the obtained image of the subject; and
    a setting unit configured to set a movement limit of the rotary table on a basis of the maximum outer diameter.

2. The X-ray CT measuring apparatus according to claim 1, wherein the imaging unit is any of a camera and a line sensor.

3. The X-ray CT measuring apparatus according to claim 1, wherein the imaging unit is directed in a direction orthogonal to a line connecting the X-ray source and a center of the rotary table, and arranged so that a center of the imaging unit coincides with an end of the rotary table on an X-ray source side.

4. An interference prevention method of an X-ray CT measuring apparatus configured to emit an X-ray from an X-ray source arranged on one side of a rotary table while rotating a subject arranged on the rotary table, and obtain a tomographic image of the subject by reconstructing projection images obtained by an X-ray detector arranged on an opposite side of the rotary table, the method comprising:
    imaging the subject from above or sideways and obtaining an image of the subject while rotating the subject on the rotary table;
    calculating a maximum outer diameter of the subject during rotation by using the obtained image of the subject; and
    setting a movement limit of the rotary table on a basis of the maximum, outer diameter.

5. The interference prevention method of an X-ray CT measuring apparatus according to claim 4, wherein the rotation and imaging of the subject on the rotary table are performed at a home position or a reference position of the rotary table.

6. The interference prevention method of an X-ray CT measuring apparatus according to claim 5, wherein the rotation and imaging of the subject on the rotary table are performed at constant angel pitches.

7. The interference prevention method of an X-ray CT measuring apparatus according to claim 6, wherein the maximum outer diameter is calculated from calculation results of all pixels obtained by comparing a previously-prepared image including no subject with the image of the subject during rotation to calculate a position of presence of the subject with respect to each image pixel.

8. The interference prevention method of an X-ray CT measuring apparatus according to claim 7, wherein a movement limit value $X_{min}$ of the rotary table is determined by the following equation:

$$X_{min}=D_{max}/2+\alpha$$

where $D_{max}$ is the maximum outer diameter of the subject during rotation, and α is an amount of margin.

* * * * *